(12) United States Patent
Le Stum

(10) Patent No.: US 8,595,181 B2
(45) Date of Patent: Nov. 26, 2013

(54) REPORT PREVIEW CACHING TECHNIQUES IN A MULTI-TENANT DATABASE

(75) Inventor: Guillaume Le Stum, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 234 days.

(21) Appl. No.: 13/093,128

(22) Filed: Apr. 25, 2011

(65) Prior Publication Data

US 2011/0270832 A1  Nov. 3, 2011

Related U.S. Application Data

(60) Provisional application No. 61/330,776, filed on May 3, 2010.

(51) Int. Cl.
*G06F 17/30* (2006.01)
*G06F 17/00* (2006.01)

(52) U.S. Cl.
USPC ........... 707/600; 707/601; 707/602; 707/603; 718/104; 718/105; 718/106; 718/107; 709/224; 709/225; 709/226

(58) Field of Classification Search
USPC .......................... 707/600–603; 718/104–107; 709/224–226
See application file for complete search history.

(56) References Cited

U.S. PATENT DOCUMENTS

| | | | |
|---|---|---|---|
| 5,072,370 A | 12/1991 | Durdik | |
| 5,787,437 A | 7/1998 | Potterveld et al. | |
| 5,794,232 A | 8/1998 | Mahlum et al. | |
| 5,941,947 A | 8/1999 | Brown et al. | |
| 5,950,190 A | 9/1999 | Yeager et al. | |
| 5,974,409 A | 10/1999 | Sanu et al. | |
| 5,987,471 A | 11/1999 | Bodine et al. | |
| 6,064,656 A | 5/2000 | Angal et al. | |
| 6,085,191 A | 7/2000 | Fisher et al. | |

(Continued)

FOREIGN PATENT DOCUMENTS

WO  2004059420  7/2004

OTHER PUBLICATIONS

[online]; [published on Oct. 17, 2008]; [retrieved on Feb. 26, 2010]; retrieved from http://en.wikipedia.org/wiki/Push_technology.

(Continued)

*Primary Examiner* — Yicun Wu
(74) *Attorney, Agent, or Firm* — Zilka-Kotab, PC

(57) ABSTRACT

The present invention is directed to methods and systems for rendering perceivable stimuli representative of information processing by a multi-tenant architecture that pre-fetches a portion of a subset of data on a multi-tenant architecture and emulates a result set of data in accordance with a report definition. To that end the method comprises identifying a subset of data on the multi-tenant architecture that is subject to a report definition. A portion of the subset is pre-fetched and analyzed to emulate a result. The emulated result is transmitted to a computer system of a user of the multi-tenant architecture. Perceivable stimuli is generated on the user computer system, in response to receiving the emulated result. In this manner, a user may have the perception of real-time processing of information in accordance with the report definition white affording the owner of the multi-tenant architecture flexibility to processes the data as desired while minimizing the user's awareness that real-time processing is not occurring.

13 Claims, 5 Drawing Sheets

(56) References Cited

U.S. PATENT DOCUMENTS

| | | | |
|---|---|---|---|
| 6,112,198 A | 8/2000 | Lohman et al. |
| 6,189,000 B1 | 2/2001 | Gwertzman et al. |
| 6,219,667 B1 | 4/2001 | Lu et al. |
| 6,226,641 B1 | 5/2001 | Hickson et al. |
| 6,233,618 B1 | 5/2001 | Shannon |
| 6,330,560 B1 | 12/2001 | Harrison et al. |
| 6,341,288 B1 | 1/2002 | Yach et al. |
| 6,345,288 B1 | 2/2002 | Reed et al. |
| 6,438,562 B1 | 8/2002 | Gupta et al. |
| 6,446,109 B2 | 9/2002 | Gupta |
| 6,453,038 B1 | 9/2002 | McFarlane et al. |
| 6,578,037 B1 | 6/2003 | Wong et al. |
| 6,609,148 B1 | 8/2003 | Salo et al. |
| 6,658,417 B1 | 12/2003 | Stakutis et al. |
| 6,721,765 B2 | 4/2004 | Ghosh et al. |
| 6,732,100 B1 | 5/2004 | Brodersen et al. |
| 6,839,680 B1 | 1/2005 | Liu et al. |
| 6,944,133 B2 | 9/2005 | Wisner et al. |
| 6,947,927 B2 | 9/2005 | Chaudhuri et al. |
| 7,076,633 B2 | 7/2006 | Tormasov et al. |
| 7,152,109 B2 | 12/2006 | Suorsa et al. |
| 7,174,483 B2 | 2/2007 | Becher et al. |
| 7,185,192 B1 | 2/2007 | Kahn |
| 7,206,805 B1 | 4/2007 | McLaughlin, Jr. |
| 7,206,807 B2 | 4/2007 | Cheenath |
| 7,209,929 B2 | 4/2007 | Dominguez, Jr. et al. |
| 7,249,118 B2 | 7/2007 | Sandler et al. |
| 7,305,577 B2 | 12/2007 | Zhang |
| 7,308,704 B2 | 12/2007 | Vogel et al. |
| 7,350,237 B2 | 3/2008 | Vogel et al. |
| 7,373,364 B1 | 5/2008 | Chapman |
| 7,441,233 B1 | 10/2008 | Orndorff et al. |
| 7,448,079 B2 | 11/2008 | Tremain |
| 7,484,219 B2 | 1/2009 | Mitra |
| 7,529,728 B2 | 5/2009 | Weissman et al. |
| 7,577,092 B2 | 8/2009 | San Andres et al. |
| 7,580,975 B2 | 8/2009 | Cheenath |
| 7,599,953 B2 | 10/2009 | Galindo-Legaria et al. |
| 7,661,027 B2 | 2/2010 | Langen et al. |
| 7,693,820 B2 | 4/2010 | Larson et al. |
| 7,698,160 B2 | 4/2010 | Beaven et al. |
| 7,734,608 B2 | 6/2010 | Fell et al. |
| 7,769,825 B2 | 8/2010 | Karakashian et al. |
| 7,774,366 B2 | 8/2010 | Fisher et al. |
| 7,779,039 B2 | 8/2010 | Weissman et al. |
| 7,805,400 B2 * | 9/2010 | Teh et al. ............. 707/600 |
| 7,814,052 B2 | 10/2010 | Bezar et al. |
| 7,814,470 B2 | 10/2010 | Mamou et al. |
| 7,827,138 B2 | 11/2010 | Salmon et al. |
| 7,849,401 B2 | 12/2010 | Elza et al. |
| 8,082,301 B2 | 12/2011 | Ahlgren et al. |
| 8,095,413 B1 | 1/2012 | Beaven |
| 8,095,532 B2 * | 1/2012 | Treleaven ............. 707/713 |
| 8,095,594 B2 | 1/2012 | Beaven et al. |
| 8,275,836 B2 | 9/2012 | Beaven et al. |
| 8,347,306 B2 * | 1/2013 | Li et al. ............. 718/104 |
| 8,452,724 B2 * | 5/2013 | Menon et al. ............. 707/603 |
| 2001/0023440 A1 | 9/2001 | Franklin et al. |
| 2002/0133392 A1 | 9/2002 | Angel et al. |
| 2004/0015578 A1 | 1/2004 | Karakashian et al. |
| 2004/0044656 A1 | 3/2004 | Cheenath |
| 2004/0045004 A1 | 3/2004 | Cheenath |
| 2004/0111410 A1 | 6/2004 | Burgoon et al. |
| 2004/0220952 A1 | 11/2004 | Cheenath |
| 2005/0283478 A1 | 12/2005 | Choi et al. |
| 2006/0095960 A1 | 5/2006 | Arregoces et al. |
| 2006/0100912 A1 | 5/2006 | Kumar et al. |
| 2006/0136382 A1 | 6/2006 | Dettinger et al. |
| 2007/0078705 A1 | 4/2007 | Abels et al. |
| 2007/0088741 A1 | 4/2007 | Brooks et al. |
| 2007/0124276 A1 | 5/2007 | Weissman et al. |
| 2007/0130130 A1 | 6/2007 | Chan et al. |
| 2007/0130137 A1 | 6/2007 | Oliver et al. |
| 2007/0150546 A1 | 6/2007 | Karakashian et al. |
| 2007/0226640 A1 | 9/2007 | Holbrook et al. |
| 2008/0010243 A1 | 1/2008 | Weissman et al. |
| 2008/0082540 A1 | 4/2008 | Weissman et al. |
| 2008/0082572 A1 | 4/2008 | Ballard et al. |
| 2008/0082986 A1 | 4/2008 | Cheenath et al. |
| 2008/0086358 A1 | 4/2008 | Doshi et al. |
| 2008/0086447 A1 | 4/2008 | Weissman et al. |
| 2008/0086479 A1 | 4/2008 | Fry et al. |
| 2008/0086482 A1 | 4/2008 | Weissman et al. |
| 2008/0086514 A1 | 4/2008 | Weissman et al. |
| 2008/0086567 A1 | 4/2008 | Langen et al. |
| 2008/0086735 A1 | 4/2008 | Cheenath et al. |
| 2008/0162544 A1 | 7/2008 | Weissman et al. |
| 2008/0201701 A1 | 8/2008 | Hofhansel et al. |
| 2008/0215560 A1 | 9/2008 | Bell et al. |
| 2008/0270354 A1 | 10/2008 | Weissman et al. |
| 2008/0270987 A1 | 10/2008 | Weissman et al. |
| 2009/0030906 A1 | 1/2009 | Doshi et al. |
| 2009/0049065 A1 | 2/2009 | Weissman et al. |
| 2009/0049101 A1 | 2/2009 | Weissman et al. |
| 2009/0049102 A1 | 2/2009 | Weissman et al. |
| 2009/0049288 A1 | 2/2009 | Weissman et al. |
| 2009/0276395 A1 | 11/2009 | Weissman et al. |
| 2009/0276405 A1 | 11/2009 | Weissman et al. |
| 2009/0282045 A1 | 11/2009 | Hsieh et al. |
| 2009/0319529 A1 | 12/2009 | Bartlett et al. |
| 2010/0191719 A1 | 7/2010 | Weissman et al. |
| 2010/0205216 A1 | 8/2010 | Durdik |
| 2010/0211619 A1 | 8/2010 | Weissman et al. |
| 2010/0223284 A1 | 9/2010 | Brooks et al. |
| 2010/0235837 A1 | 9/2010 | Weissman et al. |
| 2010/0274779 A1 | 10/2010 | Weissman et al. |

OTHER PUBLICATIONS

[online]; [published on Oct. 16, 2008]; [retrieved on Feb. 26, 2010]; retrieved from http://en.wikipedia.org/wiki/Customer_Relationship_Management.

[online]; [published on Apr. 22, 2008]; [retrieved on Feb. 26, 2010]; retrieved from http://en.wikipedia.org/wiki/Flat_file_database.

[online]; [published on Apr. 25, 2008]; [retrieved on Feb. 26, 2010]; retrieved from http://en.wikipedia.org/wiki/Relational_database.

First named inventor: Yancey, Scott, U.S. Appl. No. 12/636,658, filed Dec. 11, 2009.

First named inventor: Yancey, Scott, U.S. Appl. No. 12/636,675, filed Dec. 11, 2009.

First named inventor: Doshi, Kedar, U.S. Appl. No. 12/167,991, filed Jul. 3, 2008.

First named inventor: Bezar, Eric, U.S. Appl. No. 12/569,603, filed Sep. 2, 2010.

First named inventor: Yancey, Scott, U.S. Appl. No. 12/132,409, filed Jun. 3, 2008.

First named inventor: Durdik, Paul, U.S. Appl. No. 12/549,349, filed Aug. 27, 2009.

Lee et al: "Composition of executable business process models by combining business rules and process flows", Expert Systems With Application, Oxford, GB, vol. 33, No. 1, Dec. 22, 2006, pp. 221-229.

Mietzer et al: "Combining Different Multi-tenancy Patterns in Service Oriented Applications", IEE International Enterprise Distributed Object Computing Conference, NJ, USA, Sep. 1, 2009, pp. 131-140.

Wang et al: "Integrated Constraint Violation Handling for Dynamic Services Composition", IEE International Conference on Services Computing, NJ, USA, Sep. 21, 2009, pp. 168-175.

Wermelinger et al: "Using coordination contracts for flexible adaptation to changing business rules", Proceedings of the Sixth International Workshop on Software Evolution, NJ, USA, Sep. 1, 2003, pp. 115-120.

Wang et al: "A Study and Performance Evaluation of the Multi-Tenant Data Tier Design Patterns for Service Oriented Computing", IEE International Conference on E-Business Engineering, NJ, USA, Oct. 22, 2008, pp. 94-101.

Notification of Transmittal of the International Search Report and the Written Opinion of the International Searching Authority, or the Declaration. International Application No. PCT/US2010/050021. International Filing Date: Sep. 23, 2010.

(56) References Cited

OTHER PUBLICATIONS

First named inventor: Yancey, Scott, U.S. Appl. No. 12/197,979, filed Aug. 25, 2008.
First named inventor: Calahan, Patrick, U.S. Appl. No. 12/954,556, filed Nov. 24, 2010.
First named inventor: Pin, Olivier, U.S. Appl. No. 12/895,833, filed Sep. 30, 2010.
First named inventor: Tanaka, Jay, U.S. Appl. No. 12/831,196, filed Jul. 6, 2010.
First named inventor: Press, William A., U.S. Appl. No. 12/850,502, filed Aug. 4, 2010.
First named inventor: Tanaka, Jay, U.S. Appl. No. 12/831,209, filed Jul. 6, 2010.
First named inventor: Williams, Alexis, U.S. Appl. No. 13/028,236, filed Feb. 16, 2011.
First named inventor: Varadharajan, Arunkumaran, U.S. Appl. No. 12/909,820, filed Oct. 21, 2010.

* cited by examiner

FIG. 5

REPORT PREVIEW CACHING TECHNIQUES IN A MULTI-TENANT DATABASE

CROSS REFERENCE TO RELATED APPLICATIONS

The present application claims priority to U.S. provisional patent application No. 61/330,776 filed May 3, 2010, entitled PATENT APPLICATION REPORT PREVIEW CACHE IN A MULTI-TENANT DATABASE and identifying Guillaume Le Stum as inventor.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates generally to user interaction of a multi-tenant database and more particularly to providing real-time experience to a user running a query of the multi-tenant database.

During computational processing it is not uncommon for the resources of a computer system to become unavailable to a user. This typically occurs upon a request by the user to have a computer system implement a task that is computationally intensive. Historically, a user has been apprised of such a situation by a busy cursor. The expressions of the busy cursor are as numerous as there are companies that produce computer programs. Early APPLE® computers used a symbol of a wristwatch, spinning beach ball and the like. MICROSOFT® employs a spinning hour glass while other companies have included a running dog, tapping fingers and the like. The busy cursors typically appears when the computation resources are performing a lengthy operation indicating that computer system is temporarily unresponsive, a state from which it may recover. The busy cursor, however, has also become indicative of the computer system entering into an unrecoverable state. The resultant ambiguity in meaning leaves a user to speculate as to whether to continue to wait for the computational resources to become available or to attempt to recover computer system operation.

Techniques have been developed to provide information to a user concerning the status of operations that render computational resources unavailable. U.S. Pat. No. 7,441,233 to Orndorff et al. discloses a system and method of providing status information about a task being processed on a computer system. The task comprises an operation that blocks user activity, such as a modal task. Status information about the task is obtained during processing of the task on an event thread of a computer system. A status display is generated based upon this status information. The task yields time on the event thread, enabling the status information to be displayed in the user interface of the computer system.

A need exists, however, to provide a user with a real-time experience of accessing computational resources of a computer system processing a computationally intensive task.

BRIEF SUMMARY

The present invention features methods and systems for rendering perceivable stimuli representative of information processing by a multi-tenant architecture that pre-fetches a portion of a subset of data on a multi-tenant architecture and emulates a result set of data in accordance with a report definition. To that end, the method comprises identifying a subset of data on the multi-tenant architecture that is subject to a report definition. A portion of the subset is pre-fetched and analyzed to emulate a result. The emulated result is transmitted to a computer system of a user of the multi-tenant architecture. Perceivable stimuli is generated on the user computer system, in response to receiving the emulated result. In this manner, a user may have the perception of real-time processing of information in accordance with the report definition white affording the owner of the multi-tenant architecture flexibility to processes the data as desired while minimizing the user's awareness that real-time processing is not occurring. These and other embodiments are discussed more fully below.

BRIEF DESCRIPTION OF THE DRAWINGS

FIG. 5 is a plan view of a report builder rendered on a display shown in FIG. 4 in accordance with the present invention.

DETAILED DESCRIPTION

Figure 1:
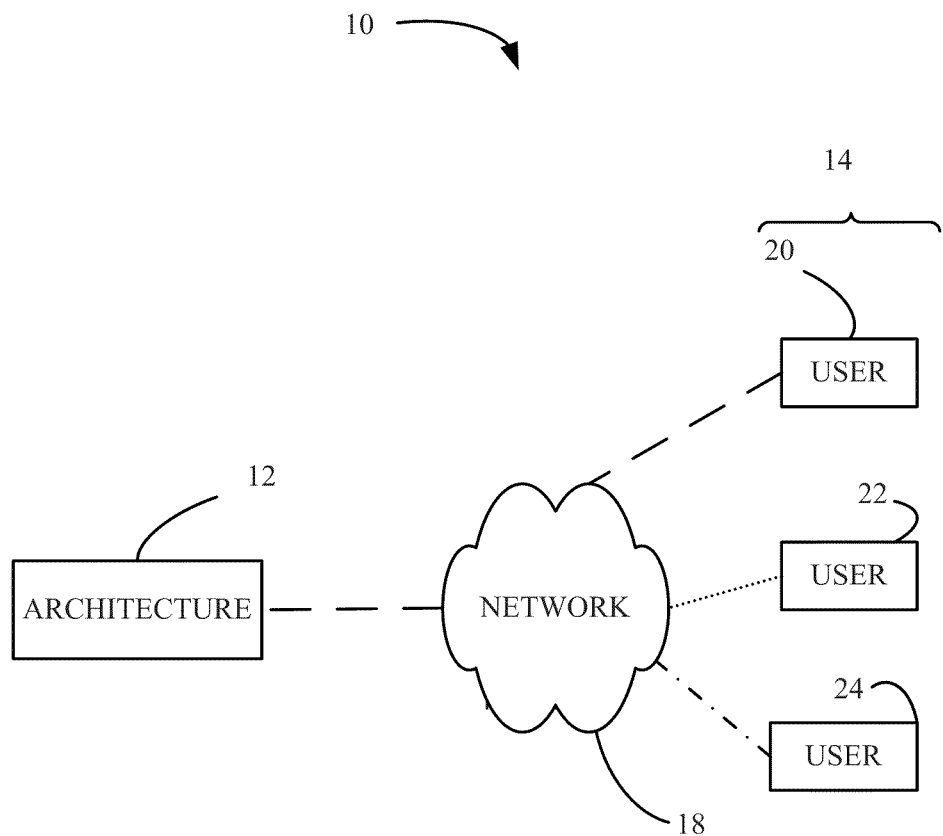
FIG. 1 is a simplified plan view of a computer network in which the current invention is practiced.

Referring to FIG. 1, a computer network 10 includes a multi-tenant database architecture 12 in data communication with client side facilities 14. Components of computer network 10 may be in data communication over any type of known data communication network 18 or combination of networks of devices that communicate with one another. Data communication network 18 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet", it will be used in many of the examples herein. However, it should be understood that the networks that the present invention might use are not so limited, although TCP/IP is a frequently implemented protocol. As a result the components of network 10 may be co-located in a common geographic area and/or building or spread across a diverse area of the globe, e.g., on several different continents. Typically, client side facilities 14 and STS 16 are in data communication with architecture 12 over the Internet using suitable computer systems. Architecture 12 includes a multi-tenant database system (MTS) in which various elements of hardware and software are shared by one or more multiple users 20, 22 and 24 associated with client side facilities 14.

Figure 2:
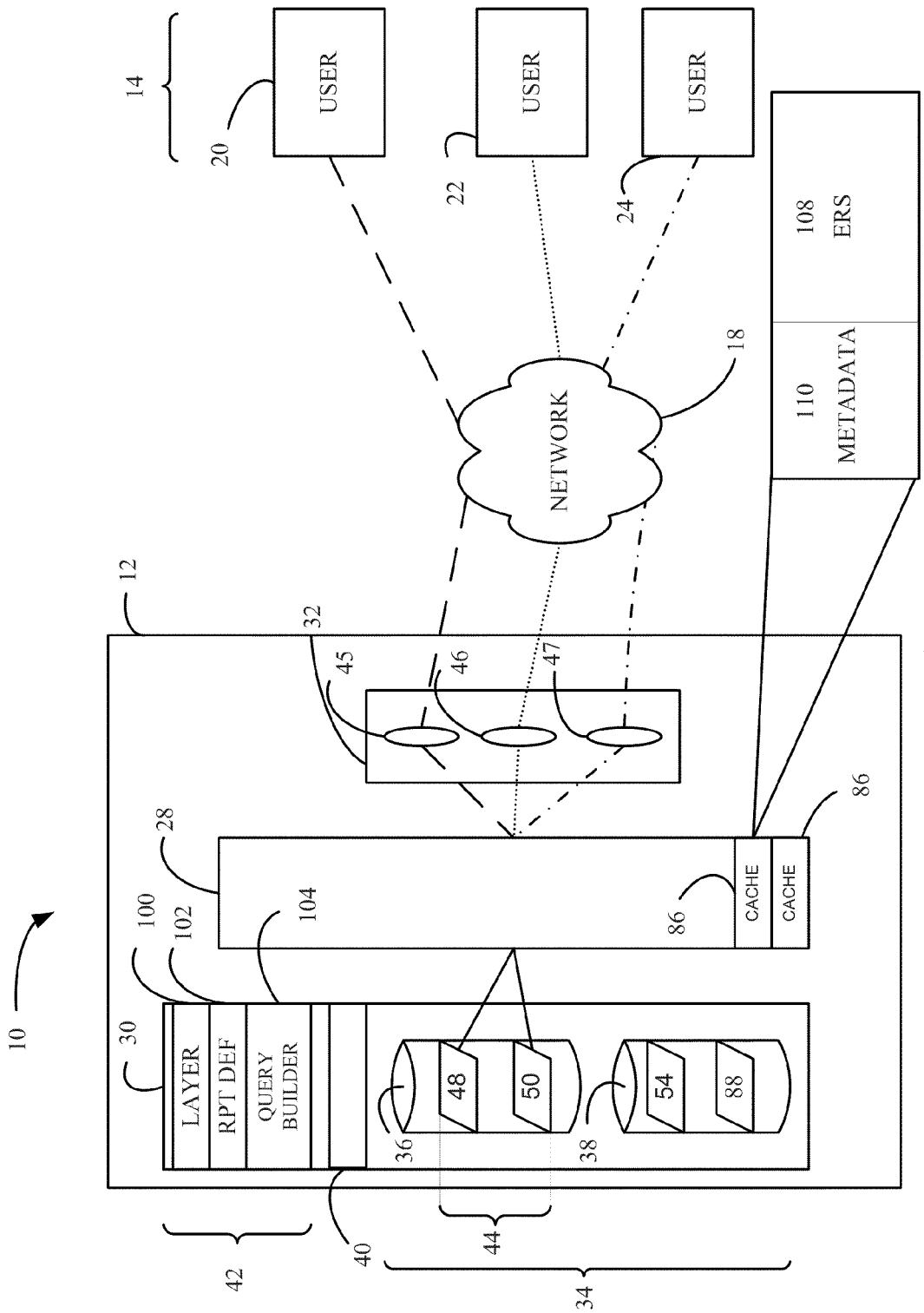
FIG. 2 is a plan view showing a representative architecture in which a multi-tenant database system, shown in FIG. 1, is employed.

A given application server of MTS may simultaneously process requests for a great number of users, and a given database table may store rows for a potentially much greater number of users. To that end, and as shown in FIG. 2, architecture 12 includes a processor sub-system 28, memory space 30, in data communication therewith, and network interface resources 32 in data communication with both memory space 30 and processor sub-system 28. Processor sub-system 28 may be any known processor sub-system in the art, e.g., the CORE DUO® or the CORE 2 DUO® from Intel Corporation of Santa Clara, Calif. Memory space 30 includes drive storage 34, shown as one or more hard drives 36 and 38, as well as data and instruction registers, shown as 40, and volatile and non-volatile memory shown as 42.

Architecture 12 provides access to a database 44 by multiple users 20, 22 and 24 of client side facilities 14 over data communication network 18 using standard computer systems (not shown). To that end, network interface resources 32 include a plurality of virtual portals 45-47. Each virtual portal 45-47 provides an "instance" of a portal user interface coupled to allow access to database 44. Typically, tenants obtain rights to store information, referred to as tenant information 48 and 50, on database 44 and make the same accessible to one or more users 20, 22 and 24 to whom the tenant provides authorization. This is typically achieved by rental agreements between the tenant and an owner/provider of architecture 12. In this manner, architecture 12 provides an on-demand database service to users 20, 22 and 24 that is not necessarily concerned with building and/or maintaining the database system; rather, these functions are addressed between the tenant and the owner/provider.

With architecture 12, multiple users 20, 22 and 24 may access database 44 through a common network address, in this example a universal resource locator (URL). In response, web-pages and other content may be provided to users 20, 22 and 24 over data communication network 18. The resources of database 44 that users 20, 22 and 24 may access can be different, depending on user's 20, 22 and 24 security or permission level and/or tenant association. As a result, data structures included in tenant information 48 and 50 are managed so as to be allocated at the tenant level, while other data structures might be managed at the user level. Because architecture 12 supports multiple tenants including possible competitors, security protocols 52 and other system software 54, stored for example on hard drive 38, maintain applications and applications' use to only those users 20, 22 and 24 with proper access rights. Also, because many tenants may desire access to architecture 12 rather than maintain their own system, redundancy, up-time, and backup are additional functions that may be implemented in architecture 12.

Figure 3:
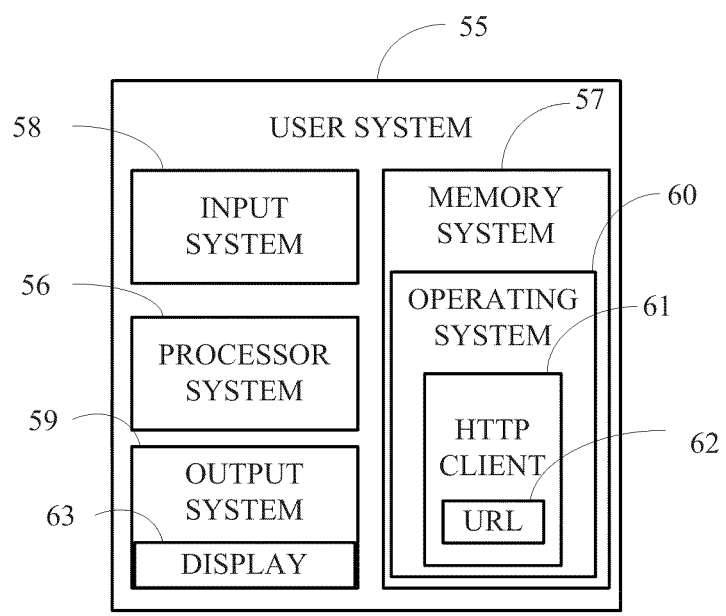
FIG. 3 is a detailed view of a computer drive shown in FIG. 2 showing the arrangement of data stored thereon.

Referring to both FIGS. 2 and 3, to facilitate web-based CRM, a user system 55 employed by one of users 20, 22 and 24 typically communicates with architecture 12 using TCP/IP and, at a higher network level, use other common Internet protocols to communicate, such as HTTP, FTP, AFS, WAP, etc. To that end, user system 55 may be any computing device capable of interfacing directly or indirectly to the Internet or other network connection, such as desktop personal computer, workstation, laptop, PDA, cell phone, or any wireless access protocol (WAP) enabled device and the like running an HTTP client. An example of a user system 55 includes a processor system 56, a memory system 57, an input system 58, and output system 59. Processor system 56 may be any combination of one or more processors. Memory system 57 may be any combination of one or more memory devices, volatile, and/or non-volatile memory. A portion of memory system 57 is used to run operating system 60 in which an HTTP client 61 executes. Input system 58 may be any combination of input devices, such as one or more keyboards, mice, trackballs, scanners, cameras, and/or interfaces to networks. Output system 59 may be any combination of output devices, such as one or more displays 63, printers, and/or interfaces to networks. HTTP client 61 allows users 20, 22 and 24 of users systems 55 to access, process and view information, pages and applications available to it from server system architecture 12 over network 18. Examples of HTTP client 61 include various browsing applications, such as Microsoft's Internet Explorer browser, Netscape's Navigator browser, Opera's browser, or a WAP-enabled browser in the case of a cell phone, PDA or other wireless device, or the like. Access is gained to requisite tenant information 48 and 50 by entering the URL (not shown) into the URL box 62 of HTTP client 61. The URL directs users 20, 22 and 24 to the appropriate virtual portal for to determine authorization and permission level to access the requisite tenant information 48 and 50.

Figure 4:
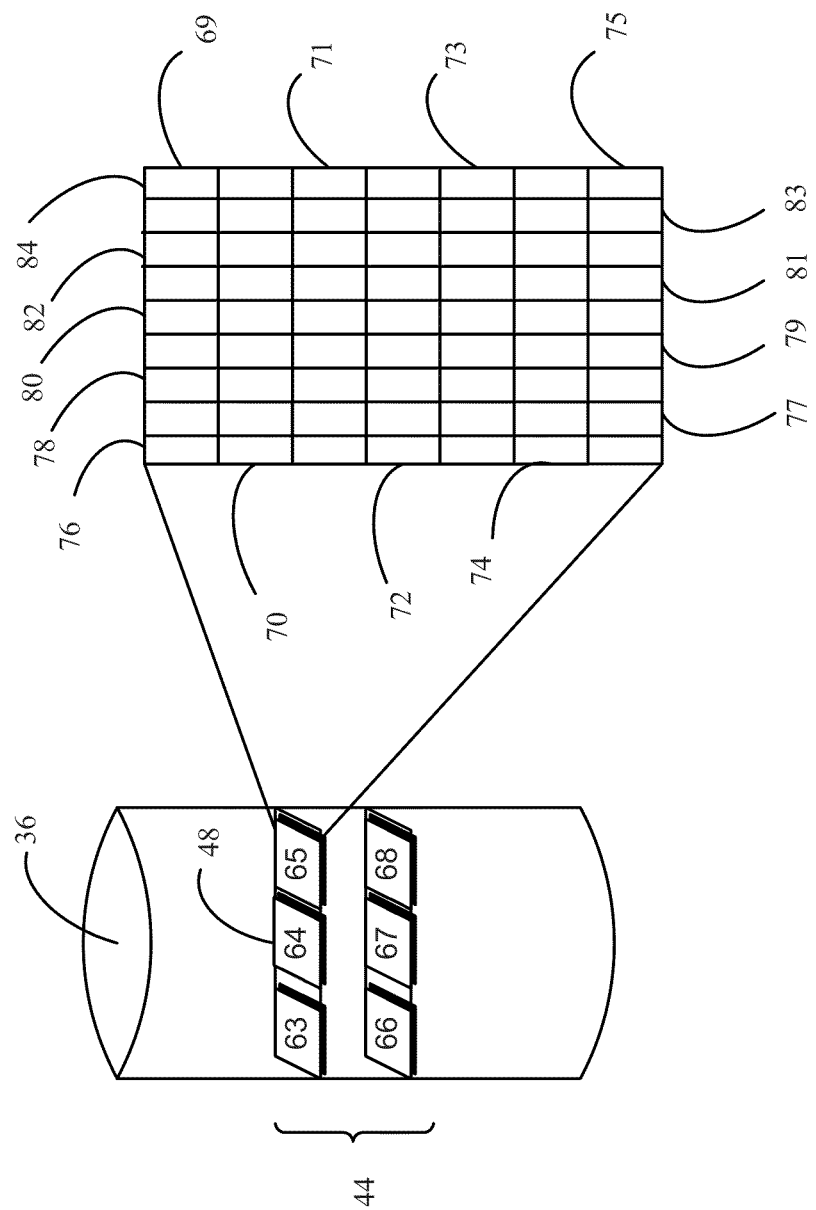
FIG. 4 is a plan view of a computer system employed by a user to communicate with the multi-tenant database shown in FIG. 2.

Referring to both FIGS. 2 and 4, one challenge presented by having large numbers of users accessing architecture concurrently is providing a user experience that avoids the perception of functional latency. This my arise, for example, when a user requests computationally intensive queries of tenant information 48 and 50 on database 44. Tenant information 48 and 50 is typically compatible with SQL methodologies. As a result, tenant information 48 and 50 may be viewed as a collection of objects, such as a set 63-68 of logical tables, containing data fitted into predefined categories. This is shown as rows, referred to as data objects 69-75 and columns 76-84 with respect to table 65. A "table" is one representation of a data object, and may be used herein to simplify the conceptual description of objects and custom objects according to the present invention. It should be understood that "table" and "object" may be used interchangeably herein. Thus, it is not unlikely that a user can request a report, in accordance with a report definition, that would require processing of hundreds of thousands if not millions of rows 69-75 and columns 76-84. Coupled with the realization that multiple users associated with multiple tenants may concurrently make such requests this may be problematic in that architecture 12 may become bogged-down so as to provide users thereof with a less than desirable experience, e.g., undue latency.

Figure 5:
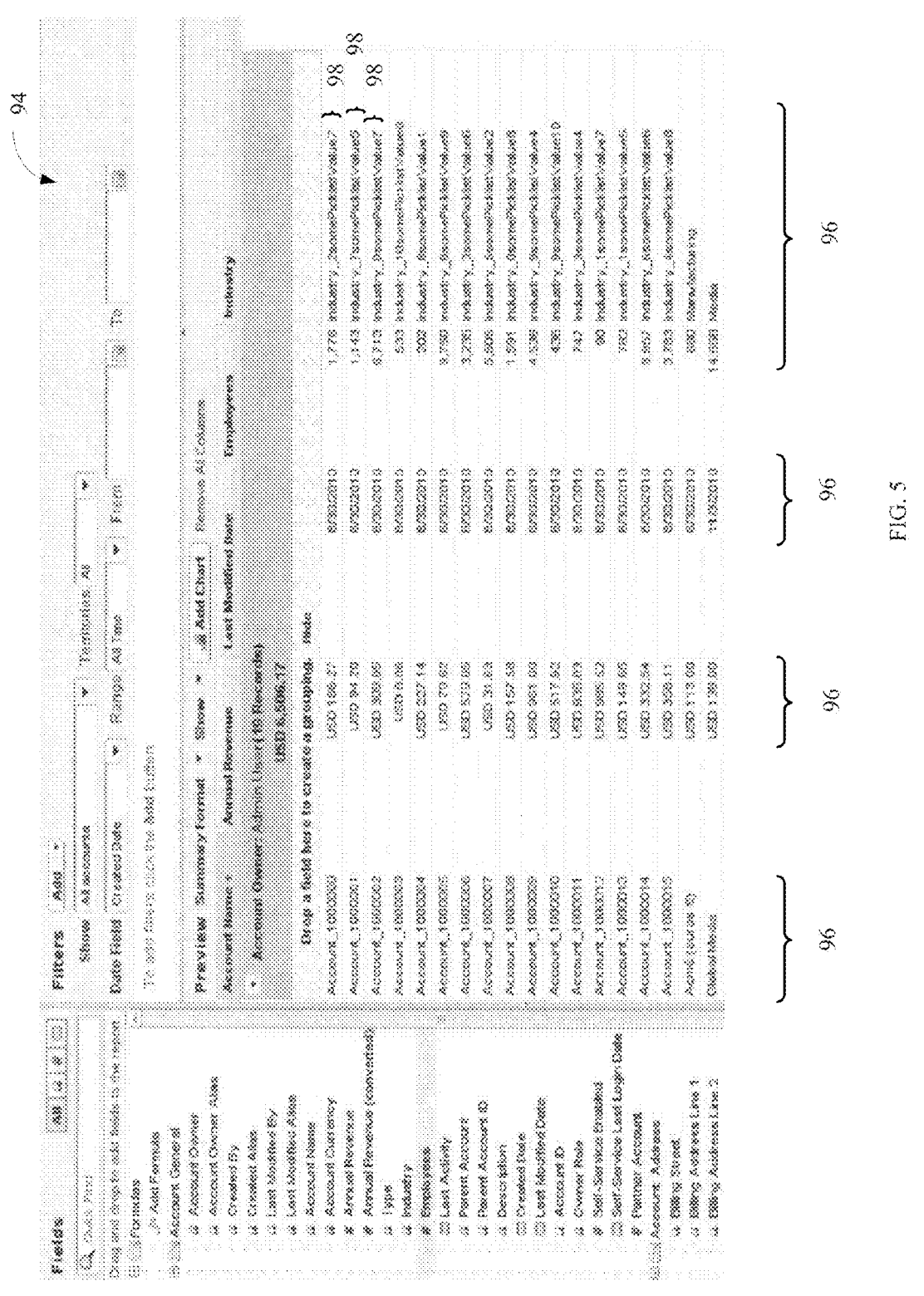

Referring to FIGS. 2, 3 and 5, the instant invention provides flexibility to the owner of architecture 12 to control the resource consumption by users 20, 22 and 24 while providing users 20, 22 and 24 the perception of real-time processing of reports and other queries for access to tenant information 48 and 50. To that end, architecture 12 includes a report preview cache 86 and associated report preview software 88 to provide flexibility to the owner of architecture to process a report query at a desired time while providing information to one of users 20, 22 and 24 that emulates a result of a query. Specifically, one of users 20, 22 and 24 employs computer system 55 to transmit a query, request for a report to architecture 12 that includes a report definition, discussed more fully below. In response an emulated result of report definition 102 is rendered on a report builder 94 that is present on display 63. As can be seen report builder 94 renders a table of information in rows 96 and columns 98 that includes results that are in response to a report definition transmitted to database 44.

Report preview software 88 interprets report definition 102 received from one of users 20, 22 and 24. Specifically, report preview software 88 instantiates a reporting layer 100 in which a report definition 102, received from one of users 20, 22 and 24, is interpreted. A query builder 104 is instantiated by the Report preview software 88 to check the security associated with tenant information 48 and 50 against access afforded to user 20, 22 or 24 that transmitted report definition 102. In this manner, report preview software 88 determines whether access my be granted to the user 20, 22 and 24 to the portions of tenant information 48 and 50 that is provided in response to report definition 102, ResultSet. Specifically, the ResultSet is generated in response to processing tenant information 48 and 50 in accordance with report definition 102. As a result, report definition 102 may call several methods and filter functions to process tenant information 48 and 50, as desired. A query builder 104 checks the information in cache 86 to determine whether data, i.e., a table of objects, related to the ResultSet is present in cache 86. If this is the case, then a subset of objects are identified and retrieved, i.e., pre-fetched, from cache 86. The subset of objects defines an emulated ResultSet (ERS) 108 and may be retrieved randomly or based upon any one or more of criteria pre-defined by either the owner of architecture 12 and/or the tenant corresponding to the data in ERS 108. For example, ERS 108 may consist of the first 50 rows of data in cache 86, or every other row, or every third row, or odd rows or even rows and the like. ERS 108 is transmitted to user 20, 22 or 24, in response to report definition 102 and is rendered by report builder 94 on display 63.

To facilitate quickly identifying objects that correspond to report definition 102, metadata 110 is stored in cache 86 along with the tenant information 48 and 50 that is included in ERS 108 and generated in response to processing tenant information 48 and 50 in accordance with report definition 102 received in response to an earlier report request. Metadata 110 includes information related to the ReportInfo, which includes a logical definition of the report that facilitates determining whether the information is related to report definition 102. To minimize the time required to read the information, metadata 110 will be stored in cache 86 as a serialized JSON object that contain identifiers unique to each object. Other information contained in each JSON object includes ResultSet columns information that identifies the type of information and the location within cache 86 where the information is stored, the version of the report definition, as well as Context information. Context information is information that is user specific, such as the organization within tenant with which user is associated and other user preferences.

It is desired that the data stored in cache 86 be able to be streamed. To that end, ERS 108 data is stored as a stream of serialized java objects. An example of information that may be contained in a data object is as follows: i) String: release version+changelist level, e.g. 160.2.2; ii) Object[ ]; resultset row; and iii) End of Stream marker. Resultsetmetadata, metadata 110, to be stored in cache 86 is retrieved through a specific method call returning a java class that can be serialized to JSON, as discussed above. These objects are then stored in cache 86 in the manner discussed above. In this fashion, upon receipt of another request for a report from a user 22, 24 or 26, report preview software 88 compares report definition 102 associated with the request and information in cache 86, as mentioned above. Metadata 110 is loaded from JSON into a java object.

If it is determined that metadata 110 matches report definition 102, referred to as a cache hit, then a sub-portion of ERS 108 is transmitted to system 55 to be rendered in report builder 94. Data stream is the transmitted to the report builder 94, as if it was based upon input of a jdbc resultset. Were a match between report definition 102 found not to exist, or otherwise correspond to, metadata 110, referred to as a cache miss, then report preview software 88 would locate the corresponding information on database 44 to generate ERS 108, using well known techniques. This information would then be recorded in cache 86 and transmitted to user system 55, with the understanding that the full report set would be generated as desired by the owner of architecture, typically at a later time. It is desired to fetch as many rows of corresponding data on database 44 up to the maximum limit. The maximum limit is typically set by the owner of architecture 12 and may be any desired.

The typical lifecycle of cache 86 is approximately fifteen minutes. As a result, it is possible that many queries of database 44 may occur in response to report requests. To ameliorate the computational requirements to generate ERS 108 in view of a cache miss, ERS 108 is generated from tenant information 48 and 50 recorded in database 44 for only those tables that have already undergone processing that are part of the report definition 102. For example, were report definition 102 to require a join operation between multiple tables to generate a ResultSet, report preview software 88 would only look to tenant information 48 and 50 that has already been generated as a result of the join operation and that corresponded to the report definition 102.

In this manner, report preview software 88 reduces the amount of resources consumed by architecture to satisfy a request for a report from users 22, 24 and 26, white providing users with a real time experience with architecture. ERS 108, however, is temporary. Eventually, a Final ResultSet (FRS) is produced and transmitted to the requesting user 22, 24 and 26. The FRS replaces the information in ERS 108 and is rendered upon the report builder 94. The timing of generation of the FRS may be dependent upon many factors and is typically a result of contractual arrangement between the owner of architecture and the tenant associated with users 20, 22 and 24. For example, users 20, 22 and 24 associated with one tenant may have a maximum latency, e.g., maximum number of computation cycles, which will be tolerated between request for the report and transmission of the FSA to the report builder. This maximum latency may be for a predetermined number of report requests during a given period of time, after which there is no upper limit on the magnitude of latency between the request and transmission of the FSA.

It is desired that security be maintained for the pre-fetch data that is commensurate with the security implemented on database 44. To that end, data in cache 86 is keyed by user so that only the user associated with the tenant may have access to the data. This may be optimized for incremental report modifications and implemented so as to minimize, if not avoid, swapping the entire cache 86 with full history. Security among the tenants is facilitated by defining within memory space 28 a cache unique to each tenant. As shown, typically architecture 12 will have multiple caches, three of which are shown as 86, 112 and 114. Each cache 86, 112 and 114 associated with a tenant that is different than the cache 86, 112 and 114 associated with the remaining tenants. As a result, each tenant has a cache 86, 112 and 114 uniquely assigned to it.

The Computer code for operating and configuring network 10 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.). Therefore, the scope of the appended claims should be accorded the broadest interpretation so as to encompass all such modifications and similar arrangements.

The invention claimed is:

1. A method, comprising:
receiving a request for a report, where the request includes a report definition indicating processing that is to be performed on data within one or more databases of a multi-tenant architecture to obtain a resulting data set;
before retrieving the resulting data set from the one or more databases, determining whether a portion of the resulting data set is currently stored in a cache, utilizing the report definition;
upon determining that the portion of the resulting data set is currently stored in the cache, retrieving the portion of the resulting data set from the cache utilizing the report definition and transmitting the portion of the resulting data set to a computer system of a user of the multi-tenant architecture;
upon determining that the portion of the resulting data set is not currently stored in the cache, retrieving the portion of the resulting data set from the one or more databases utilizing the report definition, storing the portion of the resulting data set in the cache, and transmitting the portion of the resulting data set to the computer system of the user of the multi-tenant architecture; and
after transmitting the portion of the resulting data set to the computer system of the user of the multi-tenant architecture, retrieving the entire resulting data set from the one or more databases utilizing the report definition and transmitting the entire resulting data set to the computer system of the user of the multi-tenant architecture to replace the portion of the resulting data set.

2. The method as recited in claim 1, further comprising determining from the resulting data set a plurality of tables stored on the multi-tenant architecture associated with the report definition.

3. The method as recited in claim 1, wherein the resulting data set includes a plurality of tables, each including a plurality of columns, where retrieving the portion of the resulting data set includes storing a portion of the columns in the cache.

4. The method as recited in claim 3, wherein determining whether the portion of the resulting data set is currently stored in the cache further comprises determining whether the portion of the columns in the cache satisfy criteria within the report definition.

5. The method as recited in claim 4, wherein determining whether the portion of the columns in the cache satisfy criteria within the report definition includes determining whether one or more columns are absent from the cache, where one or more additional columns are read from the one or more databases and added to the cache if it is determined that one or more columns are absent from the cache.

6. The method as recited in claim 1, wherein the portion of the resulting data set is determined based on one or more pre-defined criteria.

7. The method as recited in claim 6, wherein the predefined criteria include one or more of a predetermined number of rows and a predetermined location of rows.

8. A computer product of the type comprising a computer readable medium that contains a program to render perceivable stimuli representative of information processing by a multi-tenant architecture, said method comprising:
computer code for receiving a request for a report, where the request includes a report definition indicating processing that is to be performed on data within one or more databases of a multi-tenant architecture to obtain a resulting data set;
computer code for, before retrieving the resulting data set from the one or more databases, determining whether a portion of the resulting data set is currently stored in a cache, utilizing the report definition;
computer code for, upon determining that the portion of the resulting data set is currently stored in the cache, retrieving the portion of the resulting data set from the cache utilizing the report definition and transmitting the portion of the resulting data set to a computer system of a user of the multi-tenant architecture;
computer code for, upon determining that the portion of the resulting data set is not currently stored in the cache, retrieving the portion of the resulting data set from the one or more databases utilizing the report definition, storing the portion of the resulting data set in the cache, and transmitting the portion of the resulting data set to the computer system of the user of the multi-tenant architecture; and
computer code for, after transmitting the portion of the resulting data set to the computer system of the user of the multi-tenant architecture, retrieving the entire resulting data set from the one or more databases utilizing the report definition and transmitting the entire resulting data set to the computer system of the user of the multi-tenant architecture to replace the portion of the resulting data set.

9. The computer product as recited in claim 8, further comprising computer code for determining from the resulting data set a plurality of tables stored on the multi-tenant architecture associated with the report definition.

10. The computer product as recited in claim 8, wherein the resulting data set includes a plurality of tables, each including a plurality of columns, where retrieving the portion of the resulting data set includes storing a portion of the columns in the cache.

11. The computer product as recited in claim 10, wherein determining whether the portion of the resulting data set is currently stored in the cache further comprises determining whether the portion of the columns in the cache satisfy criteria within the report definition.

12. The computer product as recited in claim 11, wherein determining whether the portion of the columns in the cache satisfy criteria within the report definition includes determining whether one or more columns are absent from the cache, where one or more additional columns are read from the one or more databases and added to the cache if it is determined that one or more columns are absent from the cache.

13. An apparatus program to render perceivable stimuli representative of information processing by a multi-tenant architecture, said apparatus comprising:

a processor; and one or more stored sequences of instructions which, when executed by the processor, cause the processor to carry out the steps of:

receiving a request for a report, where the request includes a report definition indicating processing that is to be performed on data within one or more databases of a multi-tenant architecture to obtain a resulting data set;

before retrieving the resulting data set from the one or more databases, determining whether a portion of the resulting data set is currently stored in a cache, utilizing the report definition;

upon determining that the portion of the resulting data set is currently stored in the cache, retrieving the portion of the resulting data set from the cache utilizing the report definition and transmitting the portion of the resulting data set to a computer system of a user of the multi-tenant architecture;

upon determining that the portion of the resulting data set is not currently stored in the cache, retrieving the portion of the resulting data set from the one or more databases utilizing the report definition, storing the portion of the resulting data set in the cache, and transmitting the portion of the resulting data set to the computer system of the user of the multi-tenant architecture; and after transmitting the portion of the resulting data set to the computer system of the user of the multi-tenant architecture, retrieving the entire resulting data set from the one or more databases utilizing the report definition and transmitting the entire resulting data set to the computer system of the user of the multi-tenant architecture to replace the portion of the resulting data set.

\* \* \* \* \*